United States Patent
Crary et al.

(10) Patent No.: US 10,052,578 B2
(45) Date of Patent: Aug. 21, 2018

(54) FUEL FILTER HOUSING

(71) Applicant: TI Group Automotive Systems, L.L.C., Auburn Hills, MI (US)

(72) Inventors: Lynwood F. Crary, Preston, CT (US); Krzysztof Podstawny, Jasienica (PL); Richard Cerini, Preston, CT (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 170 days.

(21) Appl. No.: 15/134,646

(22) Filed: Apr. 21, 2016

(65) Prior Publication Data

US 2016/0310882 A1 Oct. 27, 2016

Related U.S. Application Data

(60) Provisional application No. 62/150,588, filed on Apr. 21, 2015.

(51) Int. Cl.
*B01D 35/30* (2006.01)
*F02M 37/22* (2006.01)
*B01D 35/00* (2006.01)

(52) U.S. Cl.
CPC .......... *B01D 35/30* (2013.01); *B01D 35/005* (2013.01); *F02M 37/22* (2013.01); *B01D 2201/303* (2013.01)

(58) Field of Classification Search
None
See application file for complete search history.

(56) References Cited

U.S. PATENT DOCUMENTS

| | | | | |
|---|---|---|---|---|
| 5,651,887 A | * | 7/1997 | Posner | B01D 35/147 210/232 |
| 2008/0245719 A1 | | 10/2008 | Beard | |
| 2012/0080367 A1 | * | 4/2012 | Leppert | B01D 35/157 210/172.1 |
| 2013/0068684 A1 | * | 3/2013 | Kruckenberg | B01D 35/30 210/232 |
| 2013/0312711 A1 | | 11/2013 | Mason et al. | |
| 2015/0352474 A1 | * | 12/2015 | Hawkins | B01D 35/30 210/450 |

FOREIGN PATENT DOCUMENTS

WO    2015/031767 A1    3/2015

OTHER PUBLICATIONS

European Patent Office, Rijswijk, Netherlands, International Search Report of International Application No. PCT/US2016/028560, dated Jun. 30, 2016, 5 pages.

* cited by examiner

*Primary Examiner* — Benjamin M Kurtz
(74) *Attorney, Agent, or Firm* — Brinks Gilson & Lione (57) ABSTRACT

A housing for use in a fuel system component comprises a body defining an interior and having an inlet leading into the interior and an outlet leading from the interior, wherein at least one of the inlet and the outlet is defined by a port through a wall of the body and a fitting defining a passage open to the port, the fitting have a portion extending from the port that is not circular in cross-section. The body includes a cap with the fitting extending axially from the cap. In cross-section, the fitting has a major dimension oriented generally circumferentially and a minor dimension that is smaller than the major dimension and generally oriented radially relative to the axis of the housing. Optionally, the fitting may be integrally formed with the cap.

18 Claims, 6 Drawing Sheets

FUEL FILTER HOUSING

CROSS REFERENCE TO RELATED APPLICATION

This application claims priority to U.S. Provisional application 62/150,588 filed Apr. 21, 2015, entitled "Fuel Filter Housing," the entire contents of which is herein incorporated by reference.

FIELD

This disclosure relates to a fuel system component such as may be used in a fuel delivery system for an engine.

BACKGROUND

The statements in this section merely provide background information related to the present disclosure and may not constitute prior art.

In high pressure fuel systems, such as direct injection systems used in a variety of vehicles, the fuel system components may be subjected to increased pressure pulsations and forces. Thus, features in a fuel system component that are normally not an issue in a low pressure fuel system may actually fail when incorporated into a fuel system component used in a higher pressure fuel system. For example, the inlet and outlet fittings associated with a fuel system component represent two areas that can exhibit drastic transitions in structure, thereby, resulting in high stress concentrations.

SUMMARY

The present disclosure generally provides a housing used in a fuel system component. The housing comprises a body that defines an interior and has an inlet leading into the interior and an outlet leading from the interior. At least one of the inlet and the outlet is defined by a port through a wall of the body and a fitting defining a passage open to the port. The fitting has a portion extending from the port that is not circular in cross-section. The housing is sized to withstand high pressure pulsations and forces arising from a direct injection fuel system.

According to one aspect of the present disclosure, the body may include a cap with the fitting extending therefrom. The fitting may be formed integrally with and from the same piece of material as the cap. The cap may be hemispherical or torispherical in shape. When desired, the fitting may include a bend spaced from the cap.

The housing has an axis and the fitting extends generally axially from the cap and in cross-section the fitting has a major dimension and a minor dimension that is smaller than the major dimension. The major dimension is oriented generally circumferentially and the minor dimension is oriented generally radially relative to the axis of the housing.

According to another aspect of the present disclosure, the body may include an axis and the fitting extends generally axially from the body and in cross-section taken generally perpendicularly to the axis the fitting has a major dimension and a minor dimension that is smaller than the major dimension. The fitting may have a proximal end extending from a root at the body, a distal end spaced from the body and a bend between the proximal end and the distal end, the port and at least a portion of the passage in the fitting are not circular in cross-section. The port and at least a portion of the passage are an oval shape comprising a minor dimension that extends generally radially relative to an axis of the housing.

According to yet another aspect of the present disclosure, a fuel system component is provided that comprises, consists of, or consists essentially of a filter element and the housing as previously described above and further defined herein. The filter element is located between the inlet and the outlet so that fuel flows through the inlet and the filter element before exiting through the outlet.

Further areas of applicability will become apparent from the description provided herein. It should be understood that the description and specific examples are intended for the purpose of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the housing made and used according to the teachings contained herein is described throughout the present disclosure in conjunction with a direct injection fuel system in order to more fully illustrate the composition and the use thereof. The incorporation of the housing in other fuel system components that are used in other applications or products is contemplated to be within the scope of the present disclosure.

Figure 1:
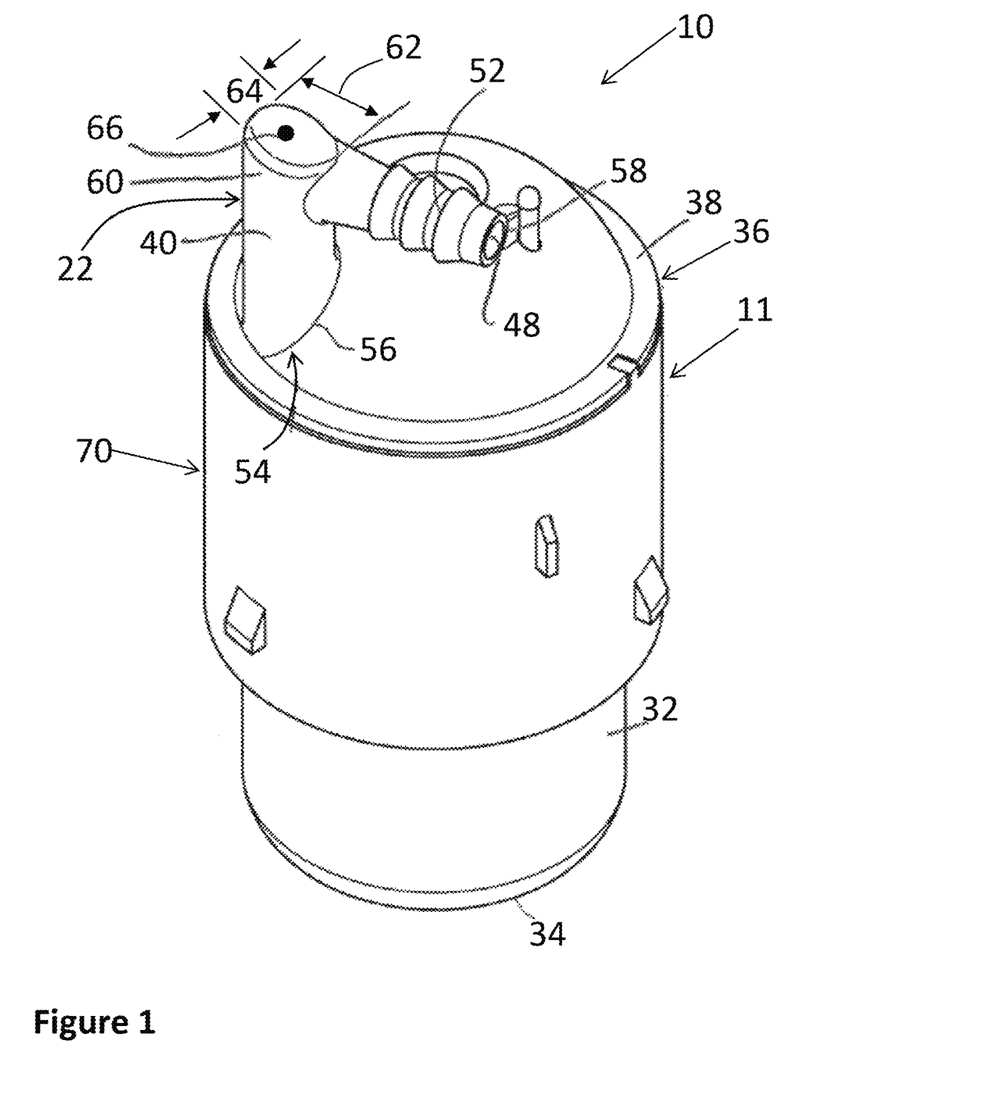
FIG. 1 is a perspective top view of a fuel filter housing adapted to contain a cylindrical and annular fuel filter.
Figure 2:
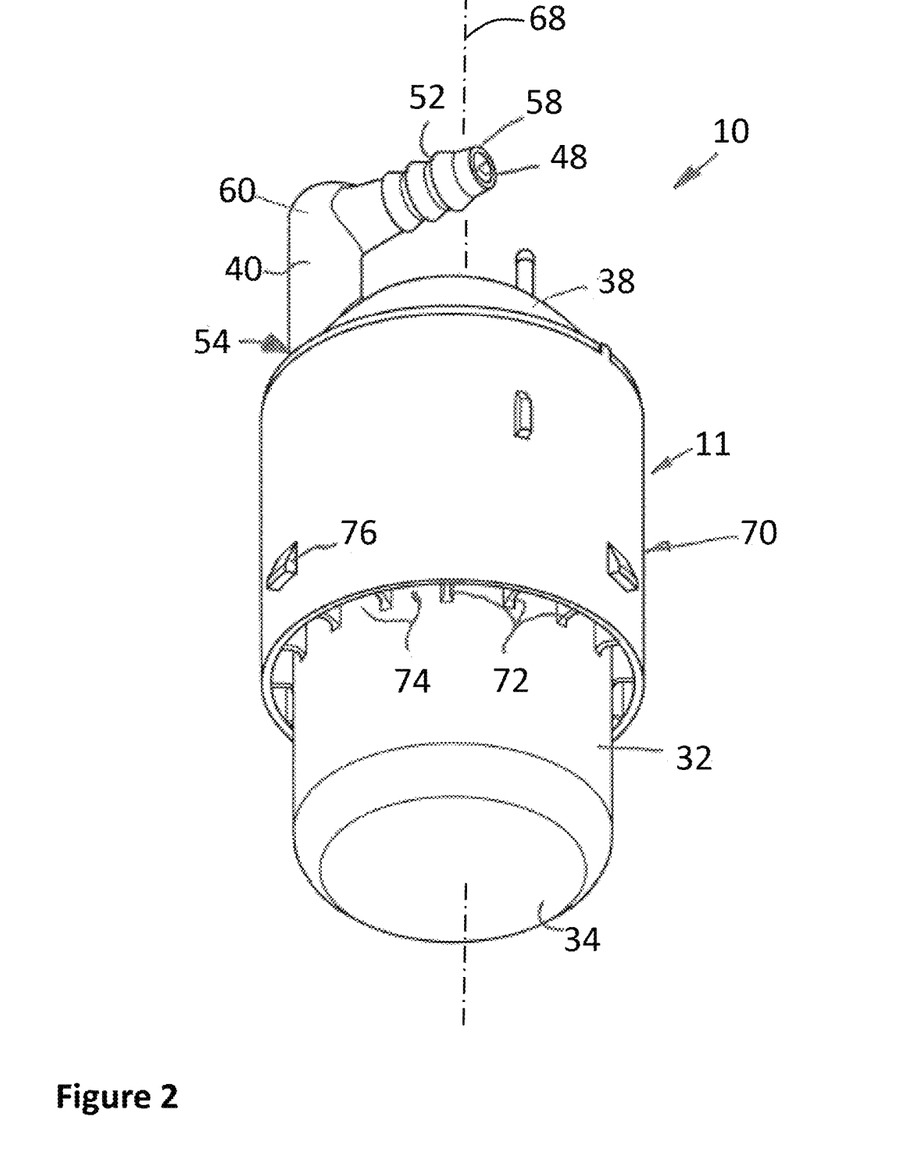
FIG. 2 is a perspective bottom view of the fuel filter housing.
Figure 3:
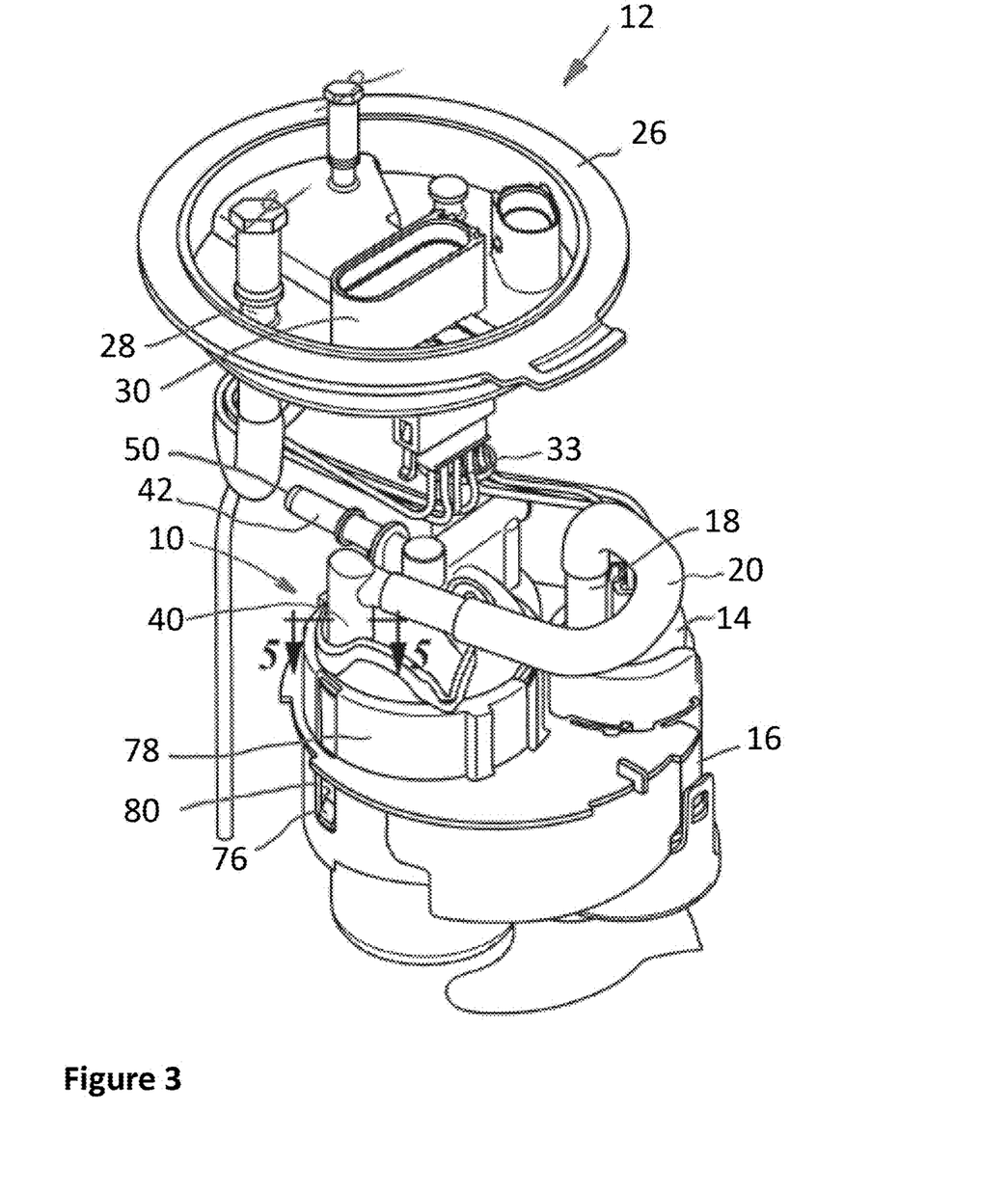
FIG. 3 is a perspective view of a representative fuel pump module that may include the fuel filter housing of FIGS. 1 and 2.

Referring in more detail to the drawings, FIGS. 1 and 2 illustrate a fuel filter 10 having a housing 11 adapted for use in a fuel delivery system that provides fuel to an engine to enable combustion in the engine. The fuel delivery system may include a fuel pump module 12, such as is shown in FIG. 3, although other modules and systems may be used, as desired. In the module 12, a fuel pump 14 may be used to pressurize liquid fuel for delivery to the engine. The fuel pump 14 may take in fuel from a fuel tank or from a reservoir 16 of the module 12 that may be received within the fuel tank to contain a smaller volume of fuel that is communicated with an inlet of the fuel pump 14. The fuel pump 14 takes in fuel, pressurizes the fuel, and discharges pressurized fuel through an outlet 18.

Figure 6:
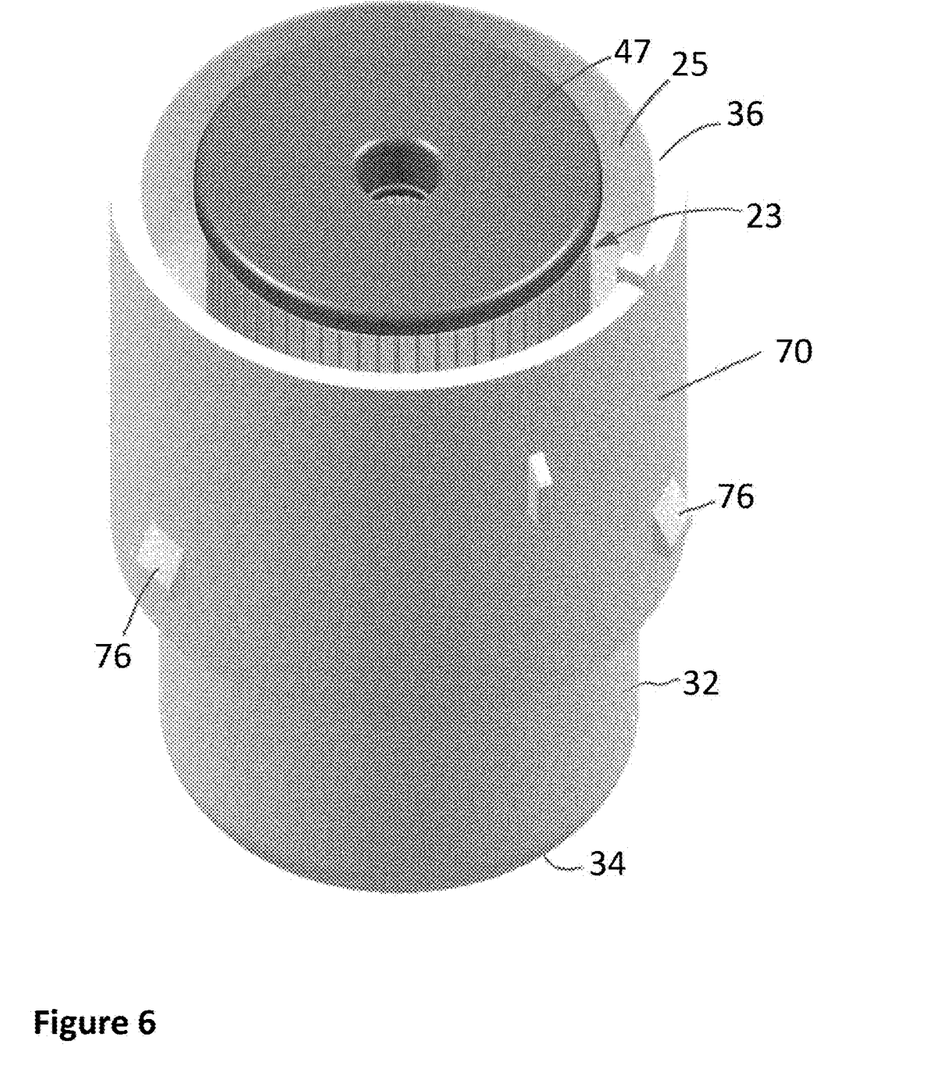
FIG. 6 is a perspective view of the filter housing with the cap removed to show an interior of the housing and a filter element in the housing.

Still referring to FIGS. 1-3, the outlet 18 may be coupled to the fuel filter 10 via a conduit 20 so that the fuel is filtered before being discharged from the module 12. The filter 10 takes in fuel through an inlet 22 in the housing 11 that communicates with one side or portion of a filter element 23 (shown in FIG. 6) received within an interior 25 of the housing 11. Within the interior 25 of the filter housing 11, fuel flows through the filter element 23 from an inlet side to an outlet side of the filter element, and then out of an outlet port 24 of the filter housing 11. From the outlet port 24, the fuel may be routed to and through a fuel pump module mounting flange 26 via one or more conduits and/or passages 28 formed through the flange 26. The flange 26 is used to connect and mount the module to the fuel tank, with the reservoir 16, pump 14, filter 10 and other components located within the fuel tank. In addition to fuel flow, an electrical connector or connector pass through 30 may pass signal or electrical wires 33 through the flange 26 and to the fuel pump 14, a fuel level sensor or other components as desired.

The fuel filter housing 11 thus receives pressurized fuel from the fuel pump 14 so the housing 11 and filter element 23 are constructed and arranged to handle the forces and pressures exerted thereon by the flowing and pressurized fuel. Some fuel filters are used in direct injection fuel systems in which a high pressure pump provides fuel to the engine. The high pressure direct injection fuel pumps can create pressure pulsations in the fuel system, and these pulsations can travel back to the fuel pump module 12 and act on, among other things, the fuel filter 10 and its housing 11. Thus, in at least some implementations, the filter housing 11 is also designed to handle these higher pressure pulsations and forces in a direct injection fuel system.

In the implementation shown, the filter housing 11 has a cylindrical body 32 that is closed at one end by an end wall 34 that may be formed in one-piece, from the same material and at the same time as the body 32. This provides a cup-shaped body 32 that is open at one end 36. The open end 36 may be closed by a cap 38 after the filter element 23 is inserted into the body 32. Inlet and outlet fittings 40, 42 may communicate with or define corresponding inlet and outlet ports 22, 24 may be provided on the cap 38 and define passages 48, 50 in communication with the interior of the filter housing 11. The filter element 23 may be located between the inlet port 22 and outlet port 24 so that fuel flows through the filter element before exiting through the outlet port 46. To increase the strength of the end wall 34 and cap 38, they may be rounded to reduce or avoid sharp corners in which higher stresses may be experienced. One or both of the end wall 34 and cap 38 may be hemispherical or torispherical in shape. A torispherical cap 38 is shown in FIGS. 1 and 2. Of course, other shapes and arrangements may be used as desired. The hemispherical shape may, in at least some implementations, provide the greatest strength but this shape is also larger than, for example, a torispherical shape which may force a reduction in filter size in certain implementations where the height of the module 12 is limited by the fuel tank in which it is received.

In addition to strengthening the end wall 34 and cap 38, it has been found that other features not normally an issue in lower pressure fuel systems may fail in higher pressure fuel systems. Areas including the inlet fitting 40 and/or outlet fitting 42, for example, represent more drastic transitions in structure and result in higher stress concentrations at those transitions. In the implementation shown, the inlet fitting 40 is integrally formed with the cap 38 in the same piece of material. The outlet fitting 42 is separately formed and later connected to the cap, such as by an interference fit or weld. A reinforced outlet body 43 may be formed integrally with the cap 38 and extending inwardly into the interior of the housing 11. The outlet body 43 may include a depending tubular portion 45 that defines part of the outlet port 46. The body 43 and tubular portion 45 may be received within an interior of the cylindrical filter element 23 and may be sealed against a cap or end 47 (FIG. 6) the filter element and help to retain the position of the filter element within the housing 11. The remaining description will be limited to the inlet fitting 40, but may apply equally to the outlet fitting 42, especially but not only, when it is formed integrally with the cap 38 as with the inlet fitting 40.

It has been found that right cylindrical fittings 40 typically used in fuel system fittings cause stress concentrations at the roots of the fittings, where the fittings meet or join with the cap 38 (or other portion of the filter housing 11). The fitting 40 is rigid and acts as a stiff rib at the cap 38, such as when placed perpendicular or nearly perpendicular to the cap surface. Further, in the implementation shown, the fitting 40 is bent, and is shown as being bent at a right angle to reduce the height of the filter housing 11 and provide a barbed surface 52 to which a conduit may be press-fit. In this way, the fitting 40 may be said to have a proximal end 54 that includes the root 56 that blends into the cap 38 and a distal end 58 spaced from the cap 38. In this configuration, an area of higher stress may exist at the root 56 and port 22. The body 34 and cap 38 may be formed from any suitable material, such as but not limited to, polyacetal (POM), polyamid (PA66), and polyphenylene sulphide (PPS).

Figure 4:
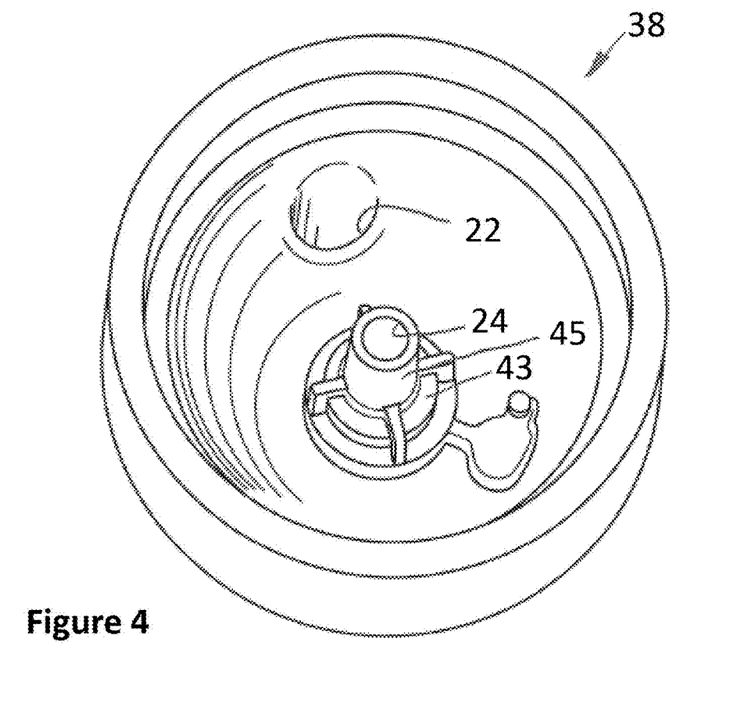
FIG. 4 is a bottom perspective view of an interior of a cap of the fuel filter housing.
Figure 5:
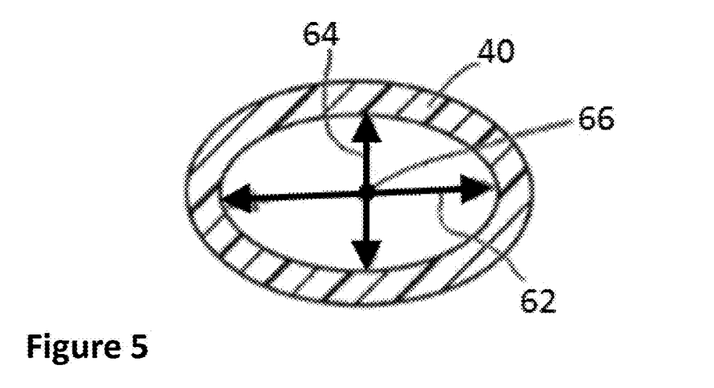
FIG. 5 is a sectional view through a port extending from the end cap.

To reduce the stresses and increase the force bearing ability of the cap 38 in the area of the fitting 40, the fitting 40 in the implementation shown is not a right cylinder and is not circular in cross-section (at least where the section is taken spaced from the cap 38), as shown in FIGS. 1, 4, and 5. In at least some implementations, the fitting 40 and associated port 22 are generally oval shaped, providing a major dimension 62 and a minor dimension 64 (see FIGS. 1 and 5), each taken through a central axis 66 of the port 22 generally perpendicular to the axis. The major dimension 62 may be generally aligned with the distal end 58 of the fitting 40. In relation to an axis 68 of the filter housing body 32, the major dimension 62 may extend generally circumferentially and the minor dimension 64 may extend generally radially as depicted and further defined in FIGS. 1 and 2. This increases the circumferential extent (e.g., the angular span of the fitting measured from the axis 68) and decreases the radial extent (e.g., the radial width) of the fitting 40 and port 22 compared to a right cylindrical fitting and port. This has been found to greatly reduce the magnitude of the stress in the area of the port 22 and fitting 40, enabling the fitting 40 and cap 38 to be used in fuel systems wherein higher pressures or forces may act on the filter housing 11.

This is believed to be due at least in part to the resulting shape of the port 22 at the junction between the fitting 40 and the curved cap 38 (for example, the torispherical cap described and shown). With a cylindrical fitting that is circular in cross-section and does not extend radially from the cap 38, the junction/port at the inside surface of the cap is generally elliptical. The more offset the fitting is compared to a radially extending fitting (not shown), the more elliptical the port is in the cap (the port is defined at the juncture between the fitting and cap). A more elliptical port has a tighter curve with a smaller radius at opposed ends of the ellipse, and in use, these areas experience higher stresses. At least in a port that is arranged generally parallel to an axis 68 of the filter body 32 (which may be coincident with a central axis of the cap 38), the major axis or dimension of the ellipse extends generally radially and the minor dimension extends generally circumferentially. In use, high stresses result at the radially inner edge and adjacent the radially outer edge, near the ends of the major axis where the curvature of the port is sharpest, or has the smallest radius.

In contrast, the juncture between the cap and the fitting that is not circular in cross-section (at least at a location spaced from the cap), and wherein the major dimension is oriented generally circumferentially as shown herein and described above, provides a more uniform port 22 shape without a sharply curved portion. This provides better stress and force distribution at the juncture and around the port 22, and avoids an unduly high stress point in the cap 38. That is, the oval or non-circular fitting 40 provides a more circular port 22 at the juncture with the curved/torispherical cap 38 than does a circular/right cylindrical fitting. In at least some implementations, the major dimension 62 and minor dimension 64 may follow the relationship: minor dimension≤major dimension≤two times the minor dimension. The major dimension 62 of the fitting 40 may be less than 100% longer than the minor dimension 64, at the juncture between the fitting 40 and the cap 38, measured at the inlet of the port 22 in the inner surface of the cap 38. In some implementations it may be less than 50% longer, such as between 0% and 30%, where 0% represents a circular port shape. Within the fitting 40, spaced from the port 22, the major dimension 62 may be at least 30% longer than the minor dimension 64 such that the passage defined within the fitting 40 and spaced from the port 22 is not circular in cross-section, as generally shown in FIG. 4.

Figure 7:
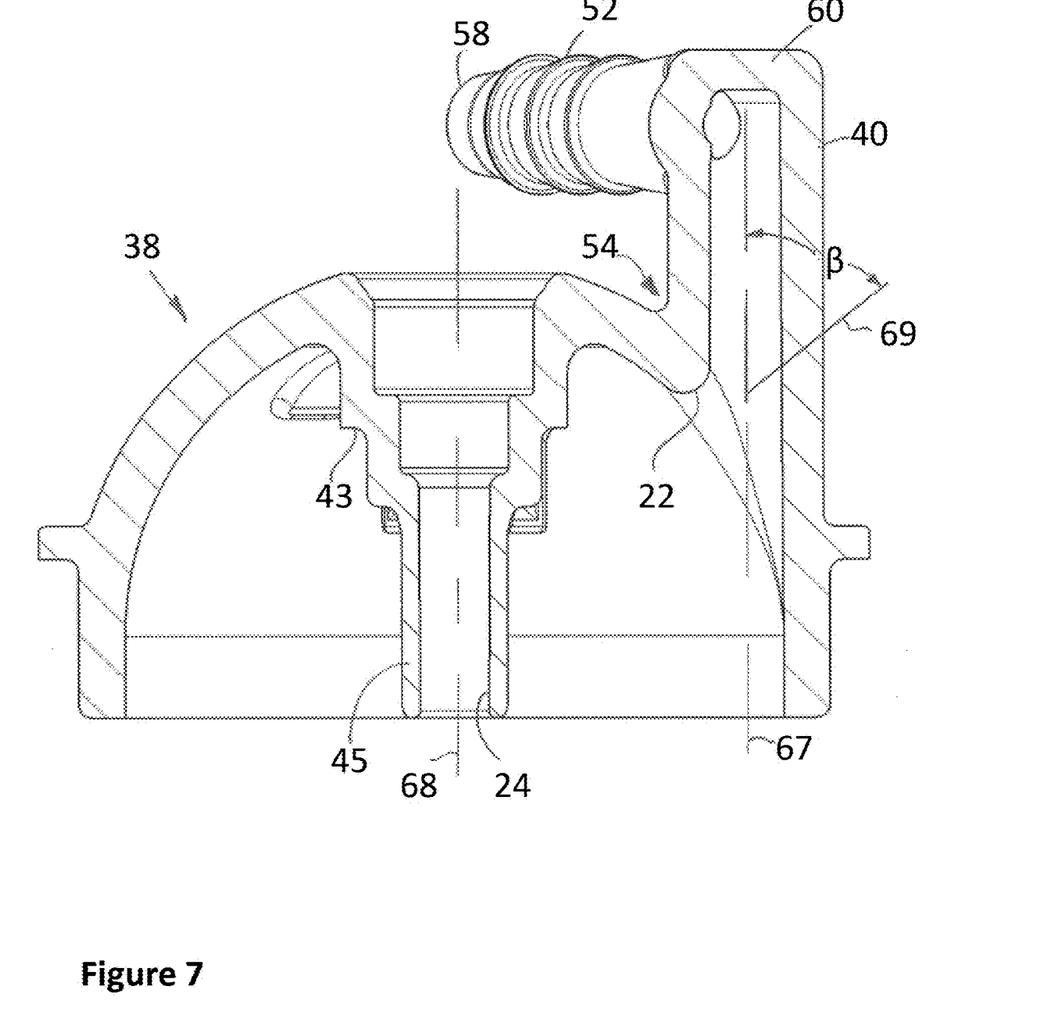
FIG. 7 is a cross-sectional view through the cap.

To avoid an unduly sharp curvature of the port 22 in the cap 38, the cross-sectional shape of the fitting 40 and/or the orientation of the fitting 40 on the cap 38 may be determined based at least in part on the shape of the cap 38 to which the fitting 40 is joined as well as the location and orientation at which the fitting is joined to the cap, as these things will determine the shape of the port 22 at the juncture between the fitting and cap. Where the fitting 40 does not extend radially outwardly from the cap, the magnitude of the angle β between an axis 67 (shown in FIG. 7) of the fitting 40 at the juncture with the cap 38 and a radius 69 of the cap intersecting the fitting axis 67 is a factor that affects the shape of the port 22 in the cap 38. In the example shown, the fitting axis 67 is parallel to the cap central axis 68, but radially offset therefrom. Thus, the fitting 40 does not extend radially outwardly from the cap 38 and instead intersects the cap 38 at an acute included angle (angle β in the implementation shown) relative to a radius 69 of the cap 38.

To further strengthen the filter housing 11, a support 70 may be provided coupled to at least a portion of the body 34. In the implementation shown, the support includes an annular skirt 70 spaced radially outwardly from and circumferentially surrounding the body 34. A plurality of connectors (e.g. ribs 72) extends radially between the skirt 70 and body 34 to connect them together. The ribs 72 may be circumferentially spaced apart providing gaps 74 between adjacent ribs. The skirt 70 may include connection features 76 adapted to engage a mount 78 (FIG. 3) in a component of the fuel pump module 12 to mount the filter 10 relative to the reservoir 16. The connection features in the embodiment shown are outwardly extending tabs 76 that may be snap-fit into corresponding cavities or openings 80 (FIG. 3) in the part to which the housing 11 is mounted. The skirt 70 may reinforce and strengthen the filter housing 11, be somewhat flexible and resilient to absorb pulsations and other loads placed on the housing 11, and also provide a larger surface area to facilitate mounting the housing to its support in the module 12.

In higher pressure fuel systems, like direct injection systems noted above, increased pressure pulsations and forces act on the fuel system components. Automotive industry testing simulates these higher forces and also other somewhat extreme conditions like extreme temperatures. In one test, the fuel system components must withstand fuel pressures of 12 bar for long periods of time (e.g. 1200 hours) and these pressures may be constant or cyclical and pulsated. This test pressure may be on the order of twice the normal system operating pressure. After these load tests, the filter housing 11 must still meet certain strength requirements such as not bursting or rupturing under a pressure greater than normal operating pressure, and perhaps several times greater in certain tests. The fuel filter 10, being one of the larger components in the fuel system, presents a significant challenge in meeting such test requirements.

In at least certain implementations, it has been determined that localized stress within the filter housing 11 should be no greater than 10 MPa in the example of a housing made from acetal/polyacetal having an as-molded tensile strength of about 64 MPa. With this stress limit, some features used to reinforce molded plastic housings, like ribs and the like, can create localized areas (e.g. at the roots of the ribs) where the stresses exceed 10 MPa. To overcome these issues, the applicants determined that a non-circular fitting 40 would reduce local stresses to an acceptable level. The term non-circular or "not circular" refers to, without limitation, oval, elliptical, oblong, and egg shapes, as well as other polygonal shapes, such as triangular, rectangular, pentagonal, or octagonal to name a few, with or without rounded edges. Traditionally, right cylindrical fittings that define passages which are circular in cross-section where used to reduce stresses and avoid areas of undesired stress concentrations. But these features provide more abrupt transitions and act as stiff ribs that create areas of higher stress in the housing. Accordingly, in at least some implementations, the non-circular fitting 40 is provided without any internal ribs or other features at the root 56. Also, the filter housing 11 can meet the above noted testing and requirements with a maximum part thickness of about 3.5 to about 4 mm, although other thicknesses can be used if desired.

The filter housing 11 may be formed from any number of pieces connected together. While described as including a cup-shaped body 32 and closed by a cap 38, the housing 11 may be otherwise constructed. Further, the body 32 of the housing may include any number of the pieces, and the cap 38 may be considered to be part of the body. The body 32 may define an interior 25 of the housing 11 and have an inlet 22 leading into the interior and an outlet 24 leading from the interior, at least one of the inlet and the outlet may be defined by a port 22 through a wall of the body (e.g. cap 38) and a fitting 40 defining a passage 48 open to the port 22. The fitting 40 have a portion extending from the port 22 that is not circular in cross-section, and the fitting may be oriented to increase the load bearing capability of the fitting in use.

Within this specification, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A housing for a fuel system component, comprising:
a body defining an interior and having an inlet leading into the interior and an outlet leading from the interior, wherein at least one of the inlet and the outlet is defined by a port through a wall of the body and a fitting defining a passage open to the port, the fitting have a portion extending from the port that is not circular in cross-section;
wherein the fitting has a proximal end extending from a root at the body, a distal end spaced from the body and a bend between the proximal end and the distal end;
wherein the port and at least a portion of the passage in the fitting are ovals comprising a minor dimension that extends generally radially relative to an axis of the housing.

2. The housing of claim 1, wherein the body includes a cap and the fitting extends from the cap.

3. The housing of claim 2, wherein the fitting is formed integrally with and from the same piece of material as the cap.

4. The housing of claim 2, wherein the housing has an axis and the fitting extends generally axially from the cap and in cross-section the fitting has a major dimension and a minor dimension that is smaller than the major dimension.

5. The housing of claim 4, wherein the major dimension is oriented generally tangentially to a circumference spaced a distance from the axis of the housing and the minor dimension is oriented generally radially relative to the axis of the housing.

6. The housing of claim 4, wherein the bend is spaced from the cap.

7. The housing of claim 1, wherein the body includes an axis and the fitting extends generally axially from the body and in cross-section taken generally perpendicularly to the axis the fitting has a major dimension and a minor dimension that is smaller than the major dimension.

8. The housing of claim 7, wherein the housing is sized to withstand high pressure pulsations and forces arising from a direct injection fuel system, such that the major dimension of the fitting is less than 50% longer than the minor dimension.

9. A fuel system component comprising:
a filter element; and
a housing having a body that defines an interior, an inlet leading into the interior, and an outlet leading from the interior;
wherein at least one of the inlet and the outlet is defined by a port through a wall of the body and a fitting defining a passage open to the port, the fitting have a portion extending from the port that is not circular in cross-section;
wherein the fitting has a proximal end extending from a root at the body, a distal end spaced from the body and a bend between the proximal end and the distal end;
wherein the port and at least a portion of the passage in the fitting are ovals comprising a minor dimension that extends generally radially relative to an axis of the housing.

10. The fuel system component of claim 9, wherein the filter element is located between the inlet and the outlet so that fuel flows through the inlet and the filter element before exiting through the outlet.

11. The fuel system component of claim 9, wherein the body includes a cap and the fitting extends from the cap.

12. The fuel system component of claim 9, wherein the fitting is formed integrally with and from the same piece of material as the cap.

13. The fuel system component of claim 11, wherein the cap is hemispherical or torispherical in shape.

14. The fuel system component of claim 9 wherein the housing has an axis and the fitting extends generally axially from the cap and in cross-section the fitting has a major dimension and a minor dimension that is smaller than the major dimension.

15. The fuel system component of claim 14 wherein the major dimension is oriented generally tangentially to a circumference spaced a distance from the axis of the housing and the minor dimension is oriented generally radially relative to the axis of the housing.

16. The fuel system component of claim 14 wherein the bend is spaced from the cap.

17. The fuel system component of claim 14, wherein the housing is sized to withstand high pressure pulsations and forces arising from a direct injection fuel system, such that the major dimension of the fitting is less than 50% longer than the minor dimension.

18. The fuel system component of claim 9, wherein the fitting has a proximal end extending from a root at the body, a distal end spaced from the body and a bend between the proximal end and the distal end, the port and at least a portion of the passage in the fitting are not circular in cross-section.

* * * * *